US011984673B2

(12) United States Patent
Koo

(10) Patent No.: US 11,984,673 B2
(45) Date of Patent: May 14, 2024

(54) OMNI-DIRECTIONAL MIMO ANTENNA

(71) Applicant: ACE TECHNOLOGIES CORPORATION, Incheon (KR)

(72) Inventor: Gwan Young Koo, Seoul (KR)

(73) Assignee: ACE TECHNOLOGIES CORPORATION, Incheon (KR)

( * ) Notice: Subject to any disclaimer, the term of this patent is extended or adjusted under 35 U.S.C. 154(b) by 213 days.

(21) Appl. No.: 17/844,342

(22) Filed: Jun. 20, 2022

(65) Prior Publication Data

US 2022/0320738 A1 Oct. 6, 2022

Related U.S. Application Data

(63) Continuation of application No. PCT/KR2020/006013, filed on May 7, 2020.

(30) Foreign Application Priority Data

Jun. 30, 2021 (KR) ........................ 10-2021-0085604

(51) Int. Cl.
*H01Q 9/04* (2006.01)
*H01Q 1/22* (2006.01)
(Continued)

(52) U.S. Cl.
CPC ......... *H01Q 9/0457* (2013.01); *H01Q 1/2291* (2013.01); *H01Q 1/246* (2013.01); *H01Q 1/48* (2013.01)

(58) Field of Classification Search
CPC .. H01Q 1/48; H01Q 9/40; H01Q 1/38; H01Q 21/28–29; H01Q 9/42; H01Q 1/521–526; H04B 7/0413
See application file for complete search history.

(56) References Cited

U.S. PATENT DOCUMENTS 7,498,995 B2 * 3/2009 Kim ........................ H01Q 21/28
343/770
2004/0027287 A1 * 2/2004 Onaka .................... H01Q 1/243
343/702
(Continued)

FOREIGN PATENT DOCUMENTS

CN 115986371 A * 4/2023 ............... H01Q 1/38
EP 2416444 B1 * 11/2015 ............. H01Q 1/243
(Continued)

*Primary Examiner* — Dimary S Lopez Cruz
*Assistant Examiner* — Aladdin Abdulbaki

(57) ABSTRACT

An omni-directional MIMO antenna comprises: a board; a first feed line and a second feed line formed on the board and spaced apart from each other; a first radiator receiving a feed signal from the first feed line; a second radiator receiving a feed signal from the second feed line; a first ground pattern that surrounds the first feed line, is electrically connected to a ground, and extends in a longitudinal direction of the board; a second ground pattern that surrounds the second feed line, is electrically connected to a ground, and extends in a longitudinal direction of the board; a parasitic patch formed on a rear surface of the board; a first feed point formed on the rear surface and providing a feed signal to the first feed line and a second feed point formed on the rear surface and providing a feed signal to the second feed line.

15 Claims, 13 Drawing Sheets

(51) Int. Cl.
*H01Q 1/24* (2006.01)
*H01Q 1/48* (2006.01)

(56) References Cited

U.S. PATENT DOCUMENTS

| | | | | |
|---|---|---|---|---|
| 2007/0115177 | A1* | 5/2007 | Kawahata | H01Q 1/243 343/702 |
| 2007/0115188 | A1* | 5/2007 | Mizoguchi | H01Q 1/2266 343/702 |
| 2007/0188388 | A1* | 8/2007 | Feng | H01Q 9/0421 343/702 |
| 2008/0174508 | A1* | 7/2008 | Iwai | H01Q 9/30 343/850 |
| 2010/0060544 | A1* | 3/2010 | Penev | H01Q 9/0442 343/876 |
| 2010/0103057 | A1* | 4/2010 | Harihara | H01Q 1/521 343/702 |
| 2010/0328163 | A1* | 12/2010 | Abramov | H01Q 9/40 343/837 |
| 2012/0274532 | A1* | 11/2012 | Kurashima | H01Q 9/145 343/848 |
| 2013/0099980 | A1* | 4/2013 | Hayashi | H01Q 5/385 343/700 MS |
| 2017/0317416 | A1* | 11/2017 | Jervis | H01Q 1/50 |
| 2018/0076376 | A1* | 3/2018 | Brady | H10N 10/855 |
| 2019/0044236 | A1* | 2/2019 | McGough | H01Q 1/526 |
| 2019/0067821 | A1* | 2/2019 | Kim | H01Q 1/243 |
| 2019/0115654 | A1* | 4/2019 | Huang | H01Q 9/40 |
| 2020/0044329 | A1* | 2/2020 | Wu | H01Q 1/36 |
| 2020/0083603 | A1* | 3/2020 | Wu | H01Q 7/00 |
| 2020/0388912 | A1* | 12/2020 | Sudo | H01Q 1/2283 |
| 2023/0141980 | A1* | 5/2023 | Tsai | H01Q 21/28 343/893 |

FOREIGN PATENT DOCUMENTS

| | | | | | |
|---|---|---|---|---|---|
| EP | 4184715 | A1 | * | 5/2023 | H01Q 1/32 |
| GB | 2500209 | A | * | 9/2013 | H01Q 1/2275 |
| KR | 20090121876 | A | * | 11/2009 | |
| KR | 100980774 | B1 | * | 9/2010 | |
| KR | 10-2019-0043484 | A | | 4/2019 | |
| KR | 10-2093204 | B1 | | 3/2020 | |
| KR | 102093204 | B1 | * | 3/2020 | |
| KR | 102319004 | B1 | * | 10/2021 | |
| KR | 20230003933 | A | * | 1/2023 | |
| WO | WO-2006110564 | A1 | * | 10/2006 | H01Q 9/0421 |
| WO | WO-2007084051 | A1 | * | 7/2007 | H01Q 1/243 |
| WO | WO-2011105650 | A1 | * | 9/2011 | H01Q 1/243 |
| WO | WO-2012053494 | A1 | * | 4/2012 | H01Q 1/3233 |

* cited by examiner

| Name | X | Y |
|---|---|---|
| m1 | 0.6170 | -17.8186 |
| m2 | 0.6980 | -18.7716 |
| m3 | 0.9600 | -20.5837 |
| m4 | 1.7100 | -21.5219 |
| m5 | 2.2000 | -28.6928 |
| m6 | 2.3000 | -28.5737 |
| m7 | 2.7000 | -30.0486 |
| m8 | 3.3000 | -29.8632 |
| m9 | 3.8000 | -22.7786 |
| m10 | 4.2000 | -40.9840 |
| m11 | 4.9000 | -35.9634 |
| m12 | 5.6000 | -29.4405 |
| m13 | 6.0000 | -30.1038 |

| Name | x | y |
|---|---|---|
| m1 | 0.6170 | -17.8166 |
| m2 | 0.6980 | -18.7716 |
| m3 | 0.9680 | -20.5837 |
| m4 | 1.7100 | -21.5219 |
| m5 | 2.2000 | -28.6928 |
| m6 | 2.3000 | -28.5737 |
| m7 | 2.7000 | -30.0486 |
| m8 | 3.3000 | -29.8632 |
| m9 | 3.8000 | -22.7766 |
| m10 | 4.2000 | -40.9840 |
| m11 | 4.9000 | -35.9634 |
| m12 | 5.6000 | -29.4405 |
| m13 | 6.0000 | -30.1038 |

OMNI-DIRECTIONAL MIMO ANTENNA

CROSS-REFERENCE TO RELATED APPLICATIONS

This application claims priority under 35 U.S.C. § 119(a) to Korean Patent Application No. 10-2021-0085604, filed on Jun. 30, 2021, in the Korean Intellectual Property Office, the disclosure of which is incorporated herein in its entirety by reference.

BACKGROUND

1. Technical Field

The present disclosure relates to a MIMO antenna, more particularly to a MIMO antenna having omni-directional radiation characteristics and high isolation characteristics.

2. Description of the Related Art

Mobile communication systems are developing at a very rapid pace. In the early stages of mobile communication, communication services inside the building were provided through outdoor repeaters. In this case, it was difficult to provide a high-quality service due to the high signal loss caused by the walls of the building. In particular, in order to solve the problem of high traffic capacity occurring in indoor communication environments such as shopping centers, buildings, and stadiums, many different studies have been conducted.

With the recent rapid increase in the number of mobile communication subscribers, the communication quality inside the building continues to become a problem. Accordingly, the installation of distributed antenna systems is increasing rapidly which is one of the ways that can solve the problem of high traffic capacity occurring in the indoor communication environments and can effectively remove the communication shadow area.

The distributed antenna system is a system that receives a signal through a large high-gain antenna installed outside, distributes the signal, and re-transmits it through small antennas installed at regular intervals throughout the interior of the building.

One of the advantages of the distributed antenna system is that it is possible to accommodate multiple frequencies with one repeater device constituting the system. That is, it can cover all existing communication methods such as the conventional 2nd and 3rd generation communication methods such as GSM method, CDMA method, and WCDMA method, 4th generation LTE communication method, and WiFi. Another advantage is that by distributing and installing small antennas inside a building, it is possible to effectively eliminate the communication shadow area and solve the problem of high traffic capacity.

Accordingly, an antenna mounted in a distributed antenna system is also required to have a wide communication bandwidth that can cover the frequency range of all communication methods provided such as the conventional 2nd and 3rd generation communication methods such as GSM method, CDMA method, and WCDMA method, 4th generation LTE communication method, and WiFi, and to have an omni-directional radiation pattern capable of securing a wide communication range by efficiently radiating in all directions in the entire communication band.

Meanwhile, in a distributed antenna system, since the system is equipped with MIMO (Multi Input Multi Output) technology for faster communication speed, the antenna is also required to be a MIMO antenna in which a plurality of radiating elements are mounted on one antenna to perform multiple input/output operations.

Here, in order to mount a plurality of radiating elements in one antenna, it is important to secure a sufficient distance between the two radiating elements to ensure isolation between the radiating elements. However, since the antenna is mounted indoors, it must be designed to be small and thin. For this reason, there is a demand for an antenna design technology capable of mounting a plurality of radiating elements in one antenna and ensuring isolation even if the distance between the radiating elements is close.

SUMMARY OF THE INVENTION

An object of the present disclosure is to provide a MIMO antenna capable of minimizing a shadow area through an omni-directional radiation characteristic.

Another object of the present disclosure is to provide a MIMO antenna having a high degree of isolation between radiators.

According to an embodiment of the present disclosure, conceived to achieve the objectives above, an omni-directional MIMO antenna is provided, the antenna comprising: a board; a first feed line and a second feed line formed on the board and spaced apart from each other; a first radiator receiving a feed signal from the first feed line; a second radiator spaced apart from the first radiator by a predetermined distance and receiving a feed signal from the second feed line; a first ground pattern that surrounds the first feed line, is electrically connected to a ground, and extends in a longitudinal direction of the board; a second ground pattern that is spaced apart from the first ground pattern by a predetermined distance, surrounds the second feed line, is electrically connected to a ground, and extends in a longitudinal direction of the board; a parasitic patch formed on a rear surface of the board; and a first feed point formed on the rear surface of the board and providing a feed signal to the first feed line and a second feed point formed on the rear surface of the board and configured to provide a feed signal to the second feed line, wherein, from the parasitic patch, first and second projections protrude in a direction of the first feed point and the second feed point.

The first and second projections protrude such that the first feed point and the second feed point are positioned between the first projection and the second projection.

The parasitic patch is disposed such that a partial region of the parasitic patch is overlapped with the first ground pattern and the second ground pattern vertically one above the other.

The omni-directional MIMO antenna further includes a connection element electrically connecting the first radiator and the second radiator and having a length of $\lambda/2$.

On one side of the first ground pattern, a first stub is formed in a direction of the second ground pattern.

On one side of the second ground pattern, a second stub is formed in a direction of the first ground pattern, and the first stub and the second stub are adjacent to each other to enable electromagnetic coupling.

On the connection element, a third stub is formed to protrude in a space direction between the first ground pattern and the second ground pattern.

According to another aspect of the present disclosure, an omni-directional MIMO antenna is provided, the antenna comprising: a board; a first feed line and a second feed line formed on the board and spaced apart from each other; a first radiator receiving a feed signal from the first feed line; a second radiator spaced apart from the first radiator by a predetermined distance and receiving a feed signal from the second feed line; a first ground pattern that surrounds the first feed line, is electrically connected to a ground, and extends in a longitudinal direction of the board; a second ground pattern that is spaced apart from the first ground pattern by a predetermined distance, surrounds the second feed line, is electrically connected to a ground, and extends in a longitudinal direction of the board; and a parasitic patch formed on a rear surface of the board, wherein, on one side of the first ground pattern, a first stub is formed in a direction of the second ground pattern, and on one side of the second ground pattern, a second stub is formed in a direction of the first ground pattern.

Accordingly, the omni-directional MIMO antenna, according to an embodiment of the present disclosure, has an advantage of securing a high degree of isolation between radiators while minimizing the shadow area through an omni-directional radiation characteristic.

DETAILED DESCRIPTION OF THE INVENTION

Figure 1:
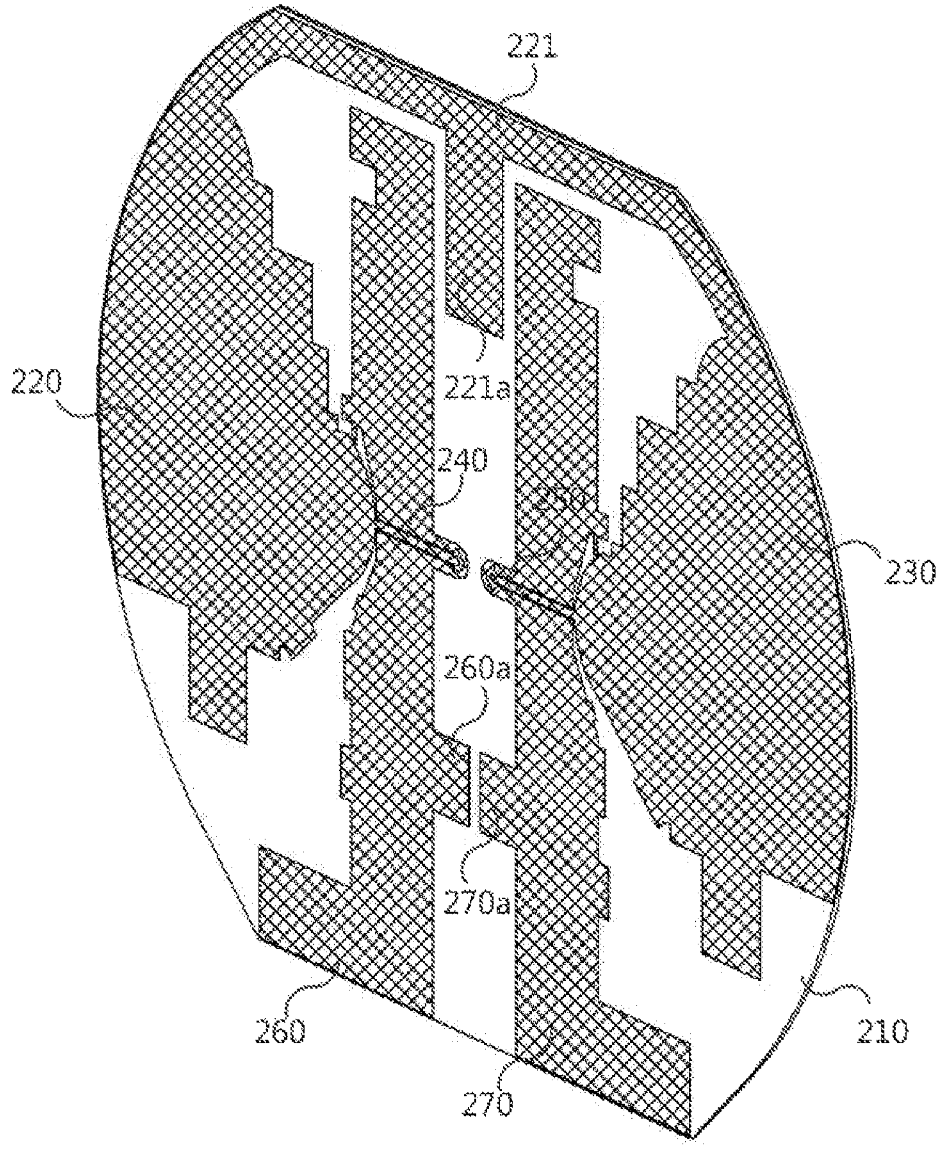
FIG. 1 shows a front perspective view of an omni-directional MIMO antenna according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
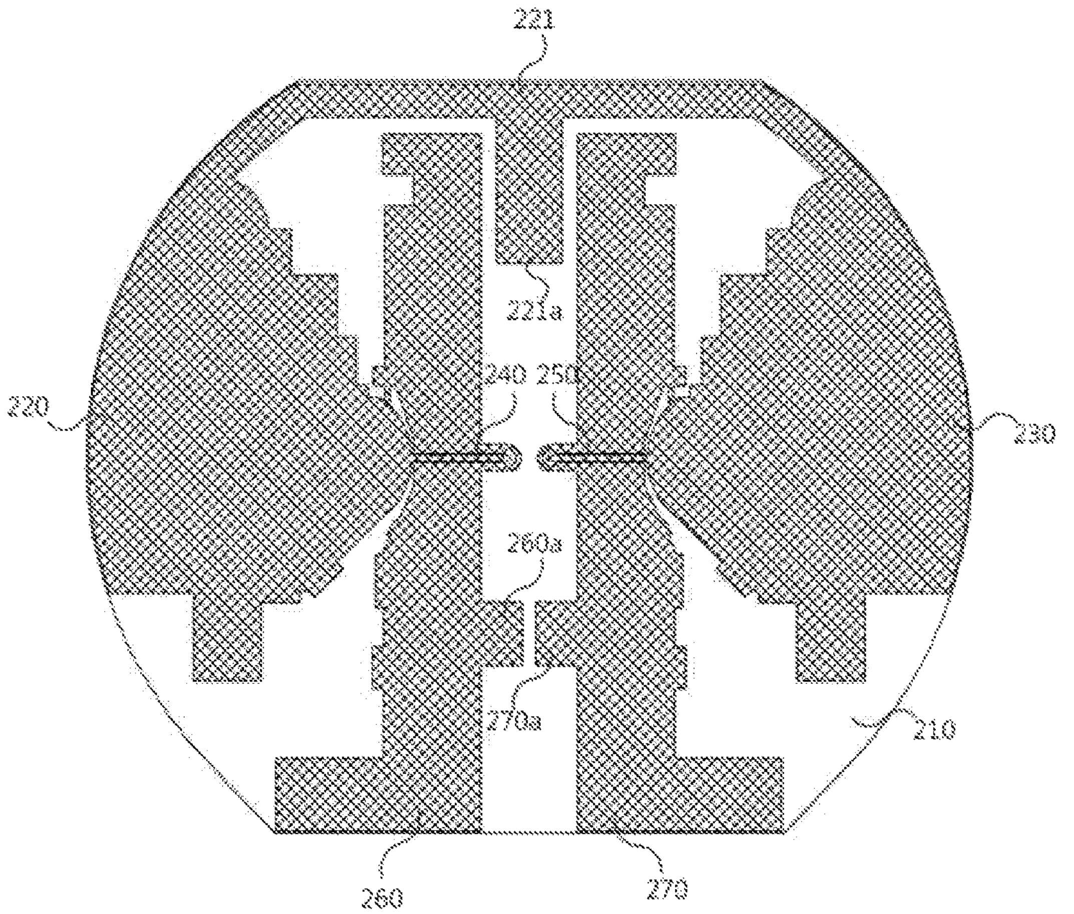
FIG. 2 shows a plan view illustrating a front surface of a board of an omni-directional MIMO antenna according to an embodiment of the present disclosure.

FIG. 1 shows a front perspective view of an omni-directional MIMO antenna according to an embodiment of the present disclosure, and FIG. 2 shows a plan view illustrating a front surface of a board of an omni-directional MIMO antenna according to an embodiment of the present disclosure.

Referring to FIG. 1 and FIG. 2, the omni-directional MIMO antenna according to an embodiment of the present disclosure includes a board 210, a first radiator 220, a second radiator 230, a first feed line 240, a second feed line 250, a first ground pattern 260, and a second ground pattern 270.

The omni-directional MIMO antenna according to an embodiment of the present disclosure is formed on the board 210, and is formed in the form of a metal pattern on the front and rear surfaces of the board 210. The structure of the front surface of the board is shown in FIG. 1 and FIG. 2. The board 210 may be made of a dielectric material, and it will be apparent to those skilled in the art that various materials may be applied to the board.

The omni-directional MIMO antenna according to an embodiment of the present disclosure includes two radiators 220 and 230, and corresponding to each of the radiators 220 and 230, a first feed line 240 and a second feed line 250 are formed. The first feed line 240 provides a feed signal to the first radiator 220, and the second feed line 250 provides a feed signal to the second radiator 230.

The first radiator 220 and the second radiator 230 are disposed to be spaced apart from each other on both sides of the front surface of the board 210. The first radiator 220 and the second radiator 230 have a vertically asymmetric structure with respect to the first feed line 240 and the second feed line 250, respectively.

Preferably, the area of the upper region of the first radiator 220 and the second radiator 230 is set to be larger than that of the lower region with respect to the first feed line 240 and the second feed line 250, respectively.

The first radiator 220 and the second radiator 230 may be implemented with various conductive materials, and as described above, they may be patterned on the board 210.

Each of the first radiator 220 and the second radiator 230 receives a feed signal from the first feed line 240 and the second feed line 250. The first feed line 240 and the second feed line 250 are electrically coupled to a feed point formed on the rear surface of the board 210 to provide a feed signal.

According to a preferred embodiment of the present disclosure, the first radiator 220 and the second radiator 230 are connected to each other through the connection element 221. The connection element 221 connects large area portions in the first radiator 220 and the second radiator 230 having an asymmetric size with respect to the feed lines.

The connection element 221 may be formed in a predesignated pattern having a length of λ/2, for example. The connection element 221 is formed to connect the two radiators in order to improve the isolation characteristic between the first radiator 220 and the second radiator 230. When the connection element 221 connecting the first radiator 220 and the second radiator 230 has a length of λ/2, a similar effect to that a current path between the two radiators 220 and 230 is blocked from each other can be exhibited. Due to such a connection element 221, good isolation characteristics can be secured even when the two adjacent radiators 220 and 230 are disposed with an interval of λ/4 or less. That is, it is possible to secure good radiation characteristics while reducing the size of the antenna.

Meanwhile, on the upper portion of the board 210, a first ground pattern 260 adjacent to the first radiator 220 and a second ground pattern 270 adjacent to the second radiator 230 are formed. The first ground pattern 260 and the second ground pattern 270 are electrically connected to a ground.

The first ground pattern 260 has a structure extending in a longitudinal direction of the board while surrounding the first feed line 240, and the second ground pattern 270 has a structure extending in a longitudinal direction of the board while surrounding the second feed line 250. The first ground pattern 260 and the second ground pattern 270 are spaced apart from each other and have a left-right symmetric structure.

According to a preferred embodiment of the present disclosure, on the first ground pattern 260, a first stub **260*a* is formed in the direction of the second ground pattern, and on the second ground pattern 270, a second stub 270*a*** is formed in the direction of the first ground pattern.

The first stub **260*a* and the second stub 270*a* are formed to improve isolation characteristics of a low band among emission bands of the first radiator 220 and the second radiator 230. It is possible to improve the isolation characteristics in the low band through electromagnetic coupling in a partial region of the first ground pattern 260 and the second ground pattern 270 through the first stub 260*a* and the second stub 270*a***.

Meanwhile, the first ground pattern 260, while surrounding the first feed line 240, allows the first feed line 240 to provide a feed signal in the CPW method. In addition, the second ground pattern 270, while surrounding the second feed line 250, allows the second feed line to provide a feed signal in the CPW method.

A third stub **221*a* protrudes from the connection element 221 into a space between the first ground pattern 260 and the second ground pattern 270. When the third stub 221*a* protrudes into a space between the first ground pattern 260 and the second ground pattern 270**, the isolation function of the connection element can be further improved.

The present disclosure places two ground patterns between the two radiators 220 and 230, suppresses interference between radiators occurring in the MIMO antenna through the connection element 221, and further improves the isolation characteristics through the first stub **260*a*, the second stub 270*a*, and the third stub 221*a***.

Figure 3:
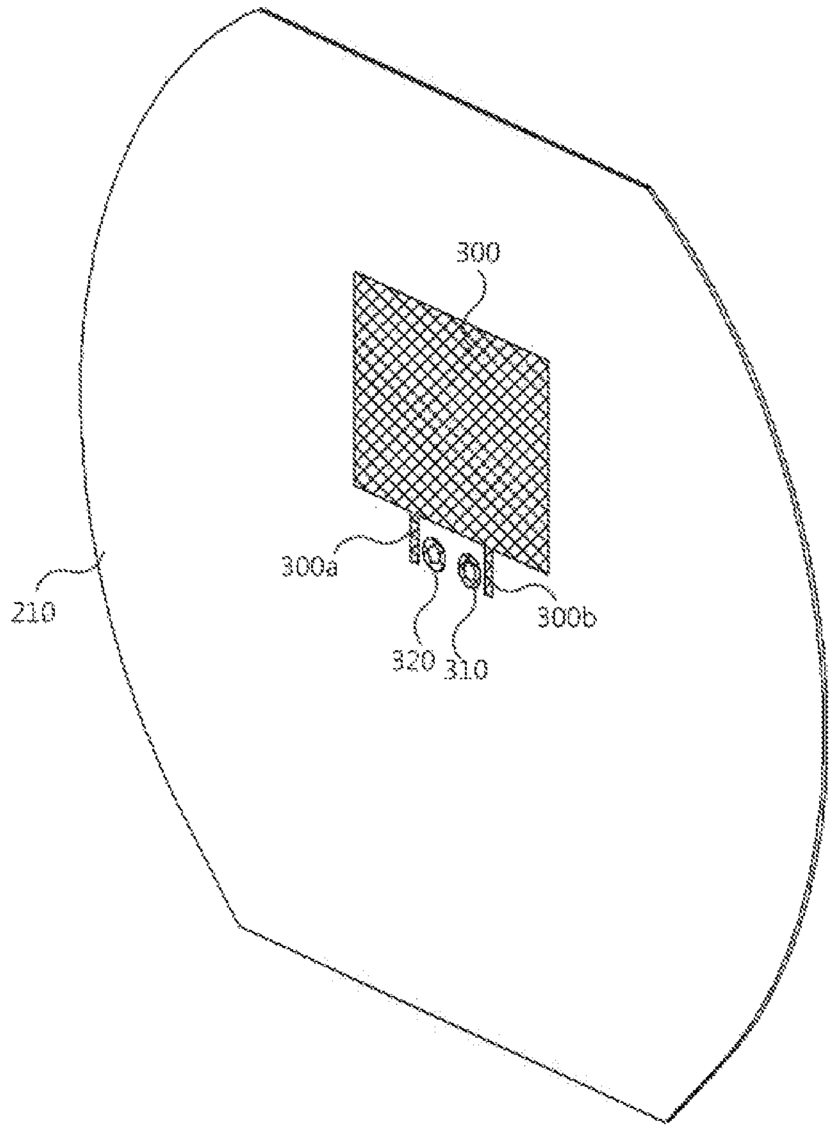
FIG. 3 shows a rear perspective view of an omni-directional MIMO antenna according to an embodiment of the present disclosure.
Figure 4:
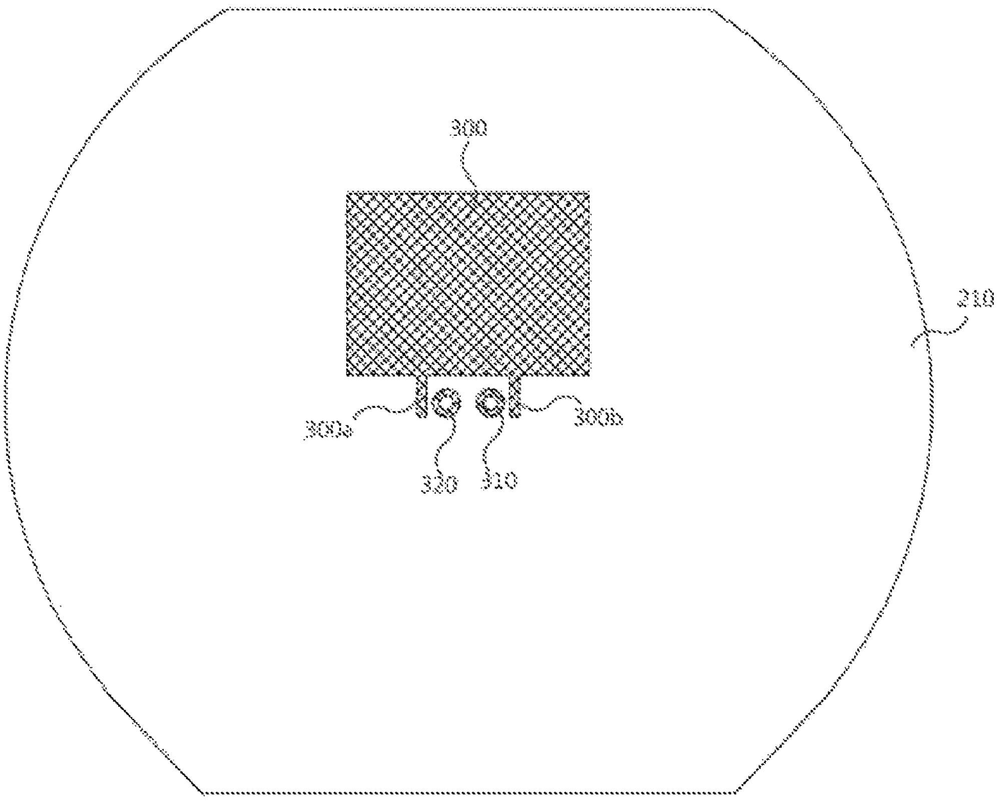
FIG. 4 shows a plan view illustrating a rear surface of a board of an omni-directional MIMO antenna according to an embodiment of the present disclosure.

FIG. 3 shows a rear perspective view of an omni-directional MIMO antenna according to an embodiment of the present disclosure, and FIG. 4 shows a plan view illustrating a rear surface of a board of an omni-directional MIMO antenna according to an embodiment of the present disclosure.

Referring to FIG. 3 and FIG. 4, in the omni-directional MIMO antenna according to an embodiment of the present disclosure, a parasitic patch 300 and two feed points 310 and 320 are formed on the rear surface of the board.

The two feed points 310 and 320 are respectively connected to the ends of the first feed line 240 and the second feed line 250 through via-holes of the board. The first feed point 310 may be connected to the end of the first feed line 240 through a via-hole, and the second feed point 320 may be connected to the end of the second feed line 250 through a via-hole.

The first feed point 310 may be coupled to an external feed line, and the external feed line may include, for example, a coaxial cable, but is not limited thereto. The second feed point 320 may also be coupled to an external feed line.

The signals fed to the first feed point 310 and the second feed point 320 may be the same signal, or different signals may be fed.

Meanwhile, a rectangular parasitic patch 300 is formed on the rear surface of the board 210 of the omni-directional MIMO antenna according to an embodiment of the present disclosure. The parasitic patch 300 is made of a conductive material and may be patterned in the form of a metal thin film.

According to an embodiment of the present disclosure, the parasitic patch 300 may be formed such that a portion of the parasitic patch 300 is overlapped with the first ground pattern 260 and the second ground pattern 270 formed on the front surface of the board 210 vertically. A partial region of the parasitic patch 300 is formed to be spaced apart from the ground patterns 260 and 270 by a predetermined distance with the board 210 interposed therebetween.

Due to this separation structure, an electromagnetic coupling phenomenon is induced, so that impedance matching between the radiators 220 and 230 and the feed lines 240 and 250 is achieved in a wide band. In addition, the parasitic patch 300 performs a function of adjusting a radiation pattern to have an omni-directional radiation pattern.

From a circuit point of view, the parasitic patch 300 can be interpreted as an inductance component, and a region in which the ground patterns 260 and 270 and the parasitic patch 300 overlap vertically can be interpreted as a capacitance component. Impedance matching in a wide band is achieved by the combination of the inductance component and the capacitance component.

According to a preferred embodiment of the present disclosure, the parasitic patch 300 is disposed such that a partial region of the parasitic patch is overlapped with the ground patterns 260 and 270 vertically but not overlapped vertically with the feed lines. When the parasitic patch 300 is disposed to overlap the feed lines, it is difficult to achieve impedance matching for a wide band.

In addition, the parasitic patch 300 is disposed in a region in which the area of the radiator is large with respect to the feed lines 240 and 250. When dividing the board into two regions based on the feed lines 240 and 250, the parasitic patch 300 is disposed in the region where the connection element 221 is formed.

Meanwhile, from one side of the parasitic patch 300, two projections of a first projection **300*a* and a second projection 300*b* protrude. According to a preferred embodiment of the present disclosure, the first projection 300*a* and the second projection 300***b* protrude such that two feed points are disposed between the two projections 300*a* and 300*b*.

FIG. 3 and FIG. 4 illustrate a case in which the first feed point 310 is disposed on the right side and the second feed point 320 is disposed on the left side. In this case, the first projection 300*a* protrudes to the left of the second feed point 320, and the second projection 300*b* protrudes to the right of the first feeding point 310.

As such, the two projections 300*a* and 300*b* protruding from the parasitic patch 300 in the direction of the feed points remarkably improve the isolation characteristics between the two radiators. When the two radiators 220 and 230 are disposed adjacent to each other with an interval of λ/4 or less, a sufficient degree of isolation may not be ensured only with the connection element 221 and the stubs 260*a*, 270*a* and 221*a*. In the present disclosure, the two projections 300*a* and 300*b* are formed to further improve the isolation characteristics.

At this time, it is important that the two projections 300*a* and 300*b* protrude such that the two feed points 310 and 320 are disposed between the two projections.

Figure 5:
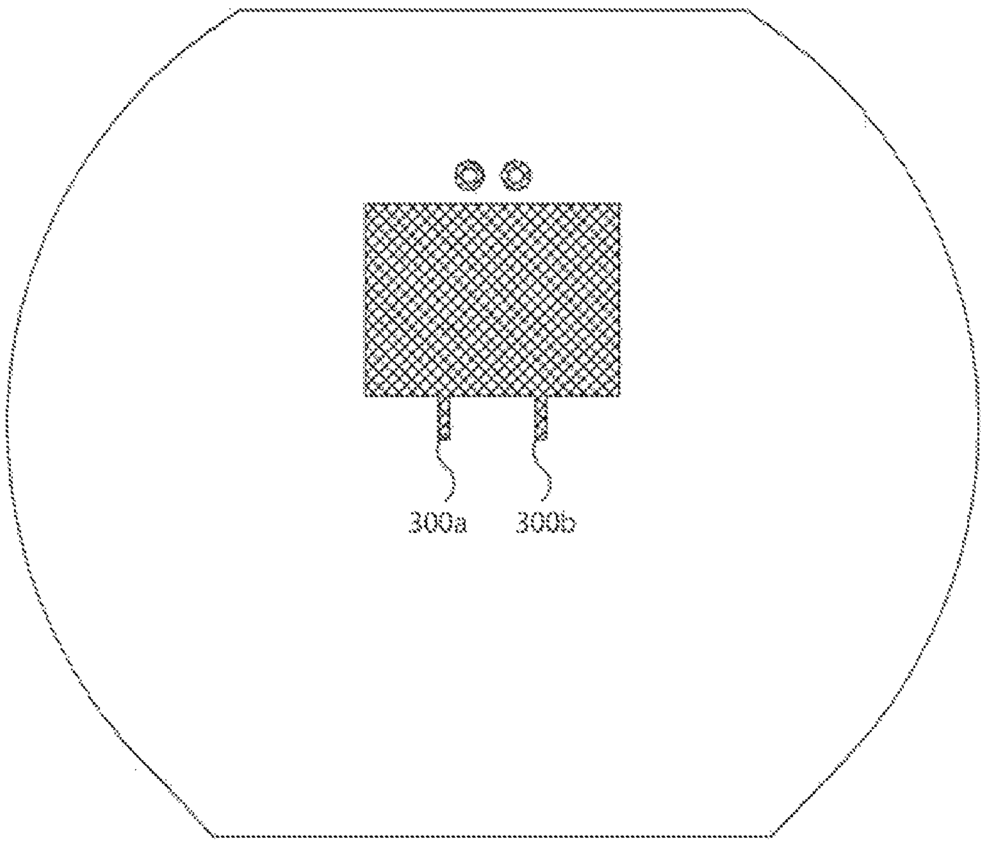
FIG. 5 shows a structure of a first reference antenna in which a position of a parasitic patch on a rear surface of a board is changed in an omni-directional MIMO antenna according to an embodiment of the present disclosure.

FIG. 5 shows a structure of a first reference antenna in which a position of a parasitic patch on a rear surface of a board is changed in an omni-directional MIMO antenna according to an embodiment of the present disclosure.

Referring to FIG. 5, when dividing the antenna of the present disclosure into two regions based on the feed lines, the parasitic patch is disposed in a region far from the connection element 221. Since the parasitic patch is disposed in a region far from the connection element 221, feed points are not located between the two projections 300*a* and 300*b*.

Figure 6A:
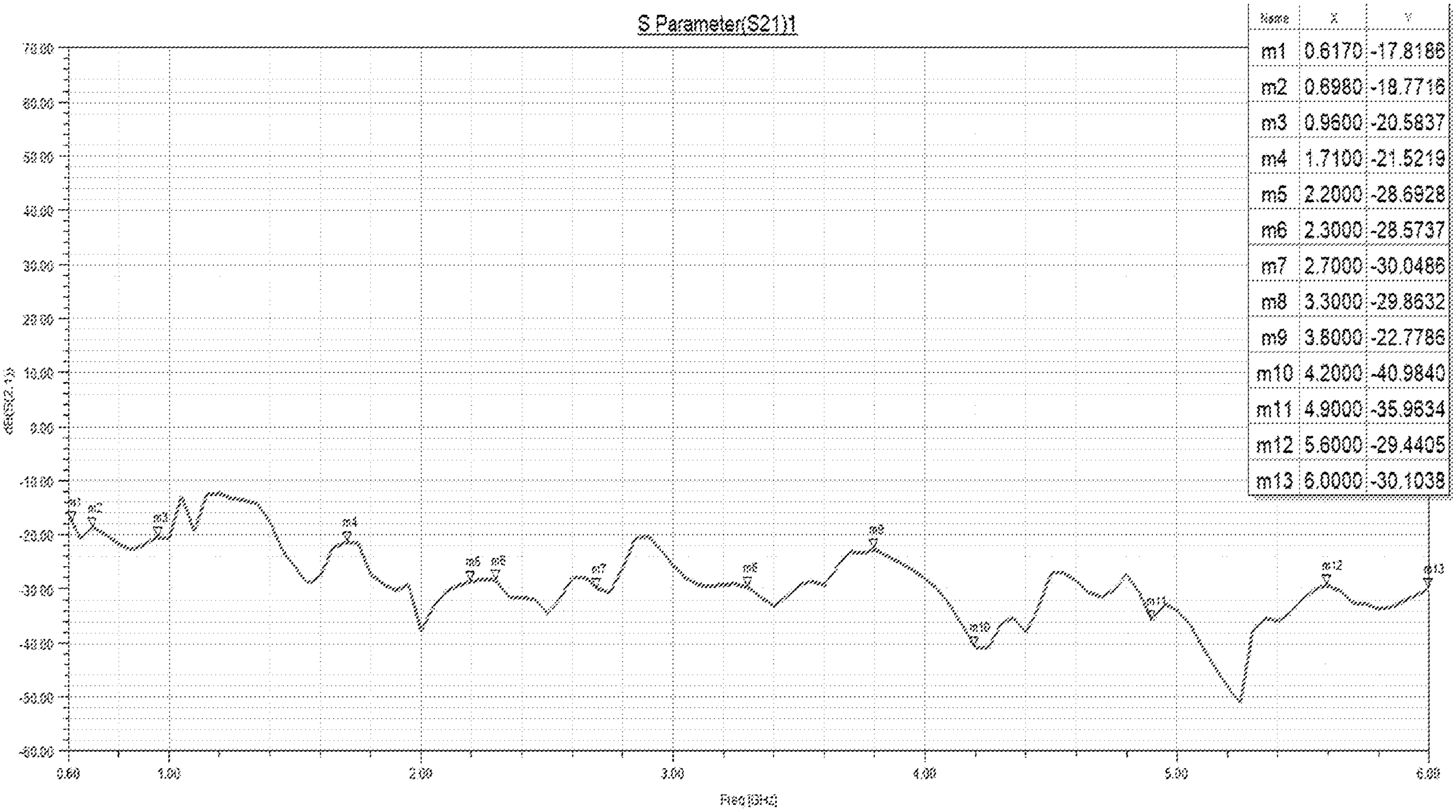
FIGS. 6A and 6B are a diagram comparing characteristics of the first reference antenna and a MIMO antenna according to an embodiment of the present disclosure.
Figure 6B:
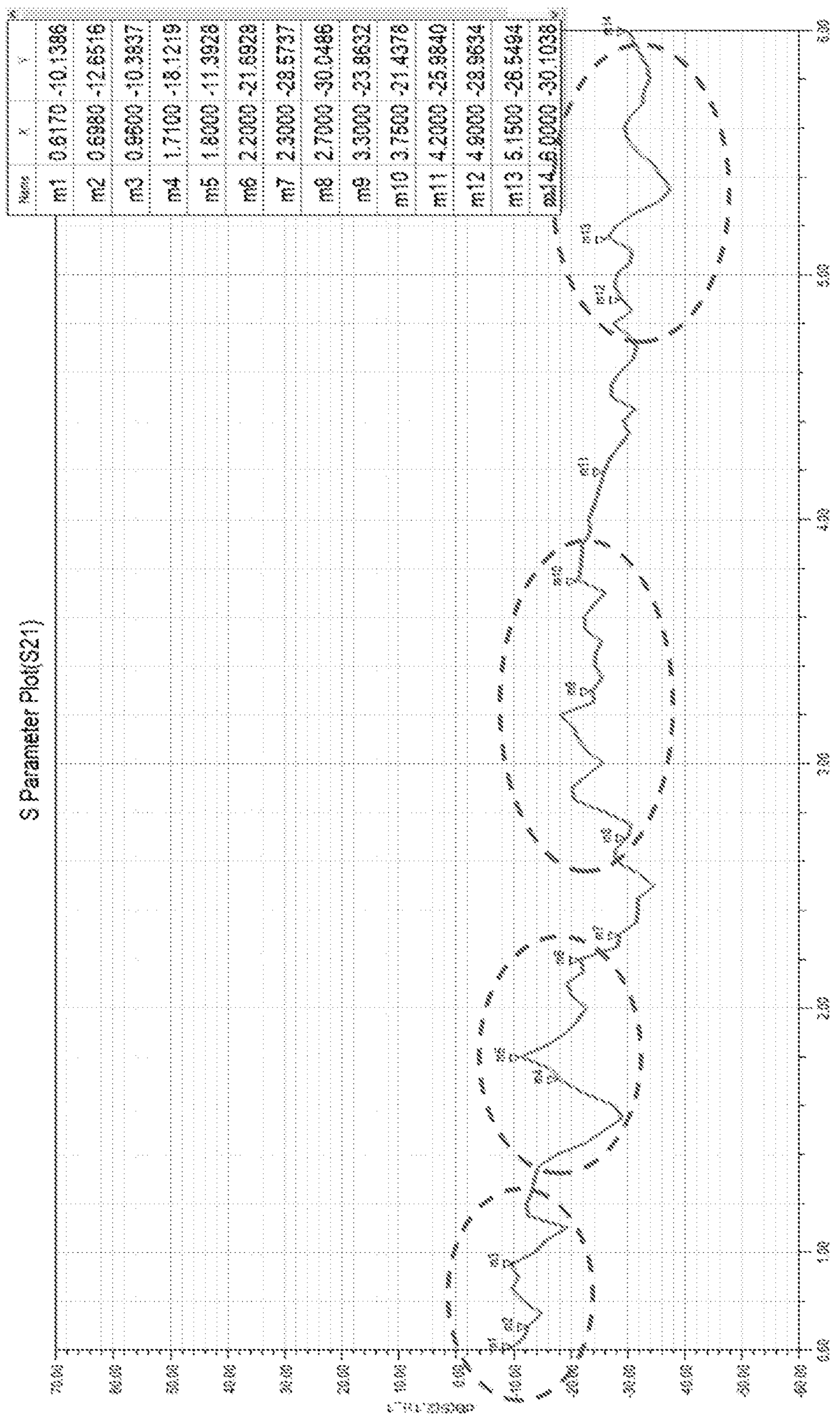

FIGS. 6A and 6B are a diagram comparing characteristics of the first reference antenna and a MIMO antenna according to an embodiment of the present disclosure.

FIG. 6A shows a S21 characteristic of a MIMO antenna according to an embodiment of the present disclosure, and FIG. 6B shows a S21 characteristic of the first reference antenna of the present disclosure.

Referring to FIG. 6B, it can be seen that the isolation characteristic is degraded at a number of frequencies including a low band, 617 MHz. It can be seen that the isolation characteristic is deteriorated when the parasitic patch is disposed in a region far from the connection element so that the feed points 310 and 320 are not located between the projections 300*a* and 300*b*.

Figure 7:
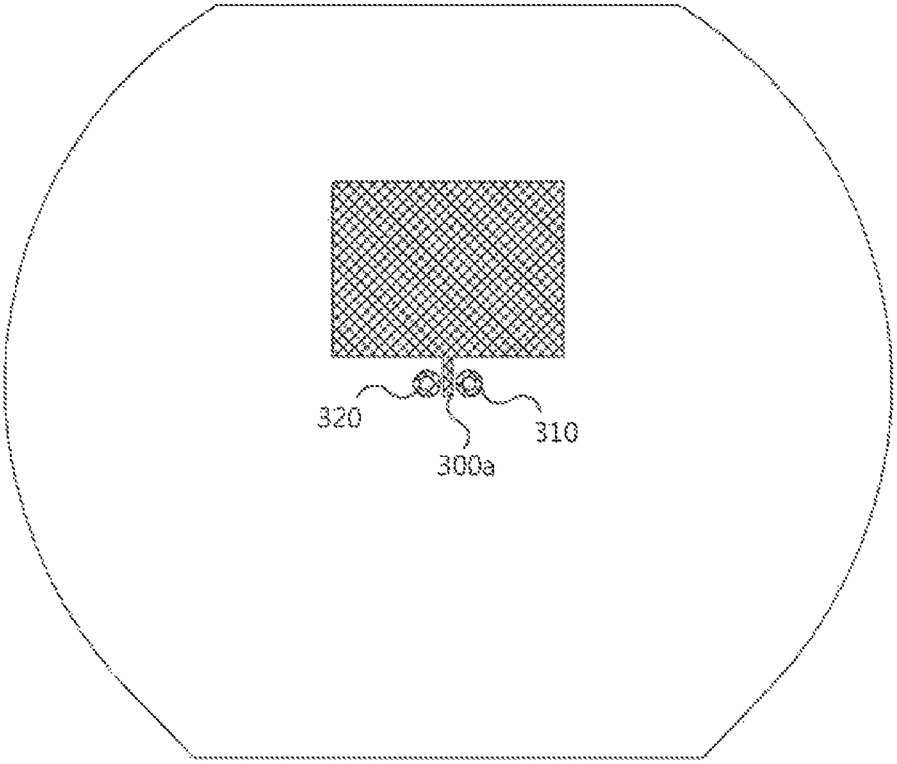
FIG. 7 shows a structure of a second reference antenna in which a projection of a parasitic patch on a rear surface of a board protrudes between two feed points in the omni-directional MIMO antenna according to an embodiment of the present disclosure.

FIG. 7 shows a structure of a second reference antenna in which a projection of a parasitic patch on a rear surface of a board protrudes between two feed points in the omni-directional MIMO antenna according to an embodiment of the present disclosure.

Referring to FIG. 7, the second reference antenna has a structure in which only one projection 300*a* protrudes from the parasitic patch. The projection protruding from the second reference antenna protrudes between the two feed points.

Figure 8A:
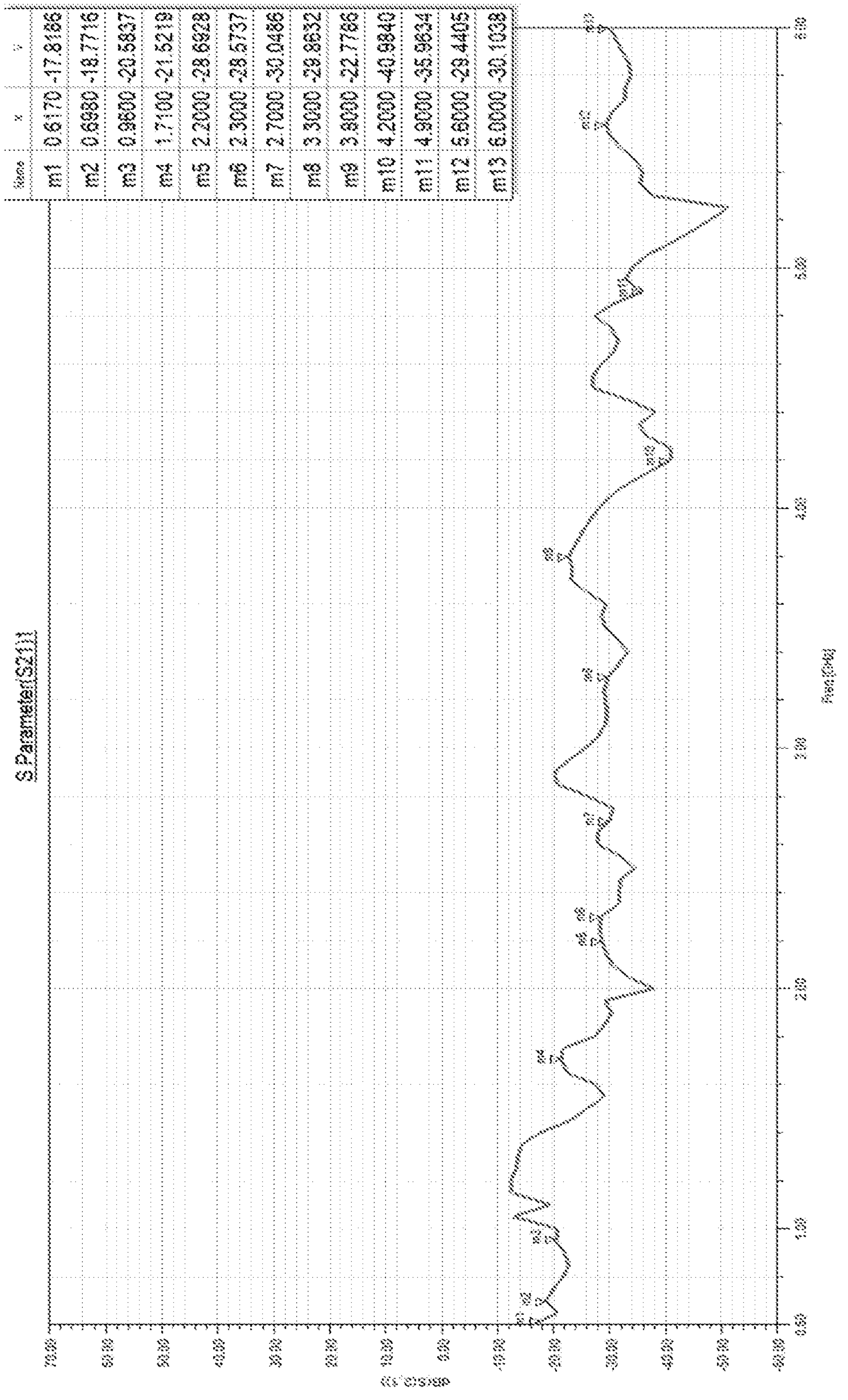
FIGS. 8A and 8B are a diagram comparing characteristics of the second reference antenna and a MIMO antenna according to an embodiment of the present disclosure.
Figure 8B:
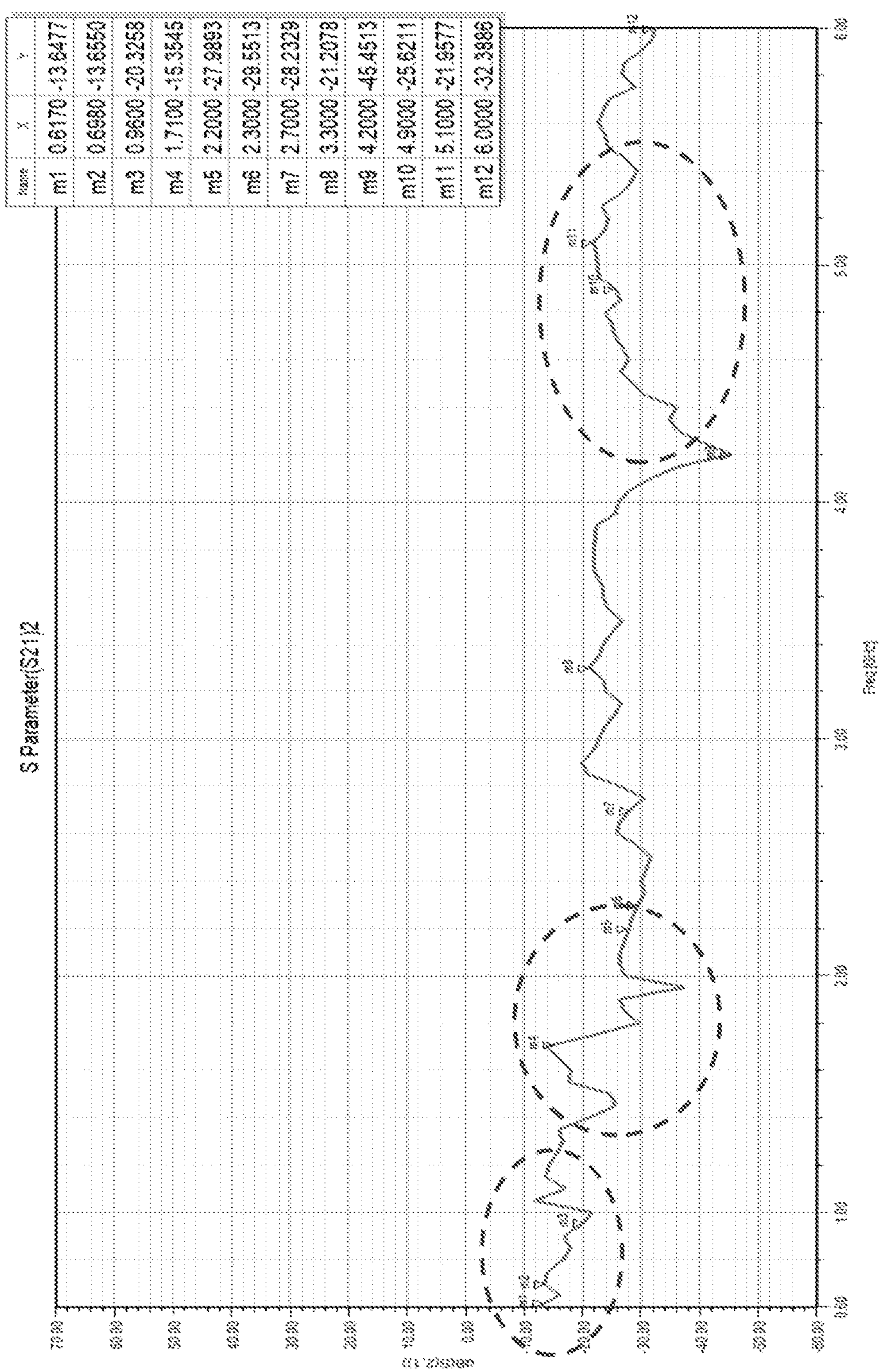

FIGS. 8A and 8B are a diagram comparing characteristics of the second reference antenna and a MIMO antenna according to an embodiment of the present disclosure.

FIG. 8A shows a S21 characteristic of a MIMO antenna according to an embodiment of the present disclosure, and FIG. 8B shows a S21 characteristic of the second reference antenna.

Referring to FIG. 8B, it can be seen that the isolation characteristic is lowered compared to the MIMO antenna according to the preferred embodiment of the present disclosure in the indicated portion. As a result, it can be seen from FIGS. 8A and 8B that the optimum isolation characteristic can be secured when feed points are located between the two projections, and an improvement of the isolation characteristic cannot be expected when a projection protrudes between the feed points.

Figure 9:
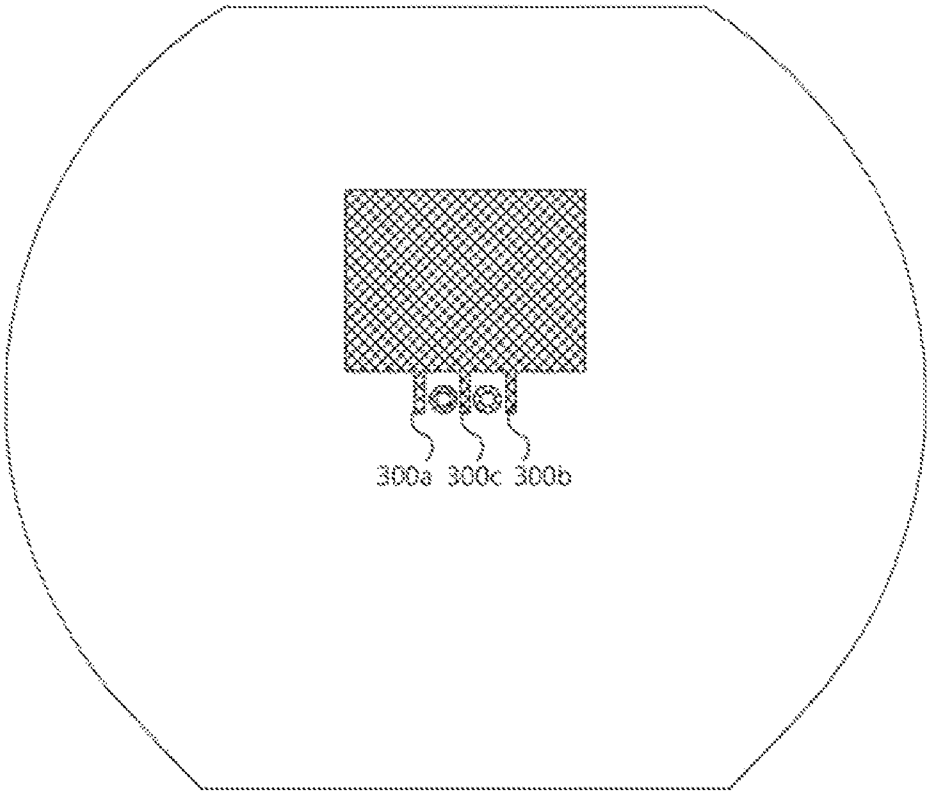
FIG. 9 shows a structure of a third reference antenna in which the number of projections of a parasitic patch on a rear surface of a board is increased in the omni-directional MIMO antenna according to an embodiment of the present disclosure.

FIG. 9 shows a structure of a third reference antenna in which the number of projections of a parasitic patch on a rear surface of a board is increased in the omni-directional MIMO antenna according to an embodiment of the present disclosure.

Referring to FIG. 9, in the third reference antenna, three projections 300*a*, 300*b* and 300*c* protrude from the parasitic patch. Compared with the MIMO antenna according to an embodiment of the present disclosure, a third projection 300*c* additionally protrudes between the first feed point 310 and the second feed point 320.

Even in a structure in which three projections protrude as shown in FIG. 9, proper isolation characteristics cannot be ensured.

Figure 10A:
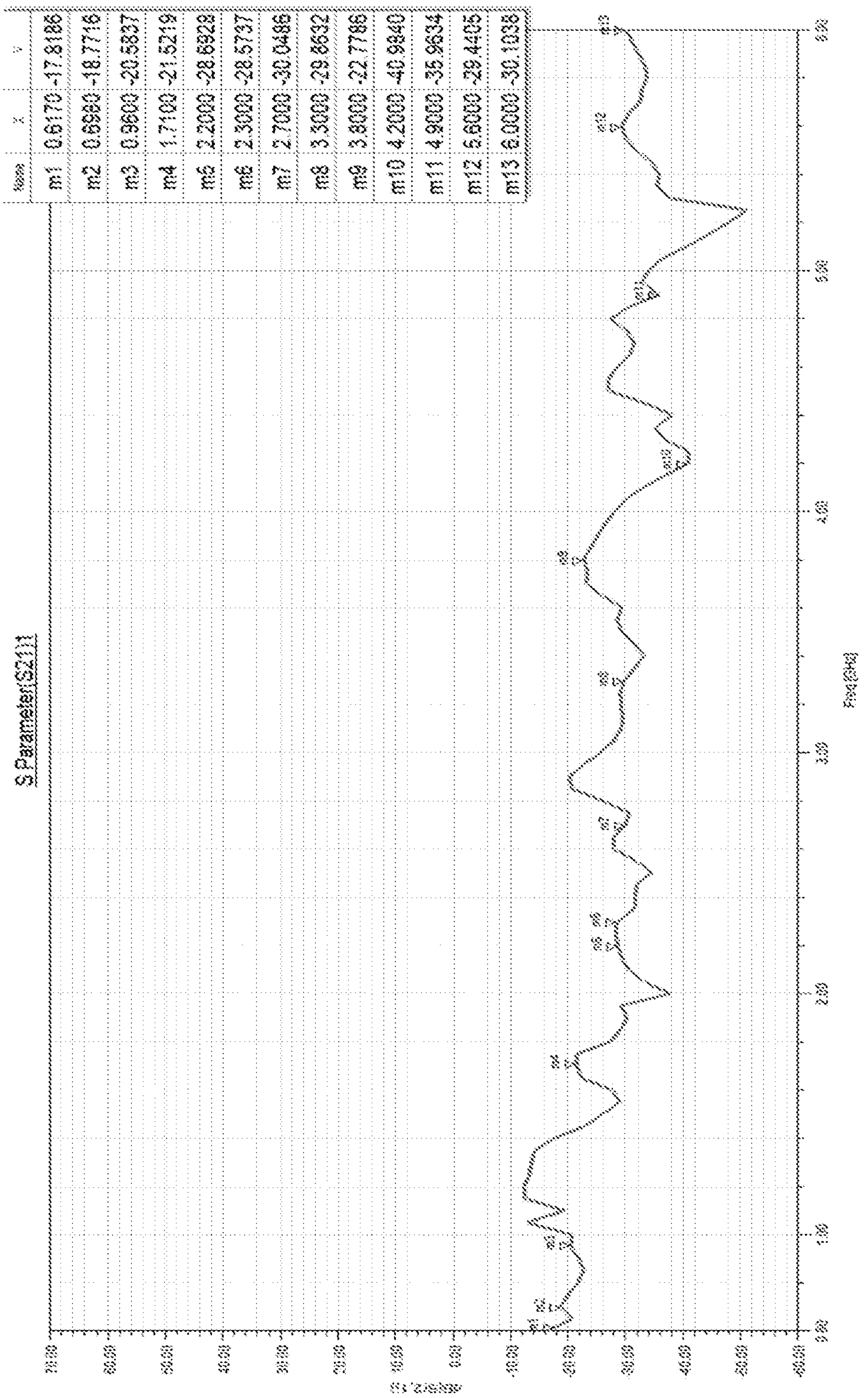
FIGS. 10A and 10B are a diagram comparing characteristics of the third reference antenna and a MIMO antenna according to an embodiment of the present disclosure.
Figure 10B:
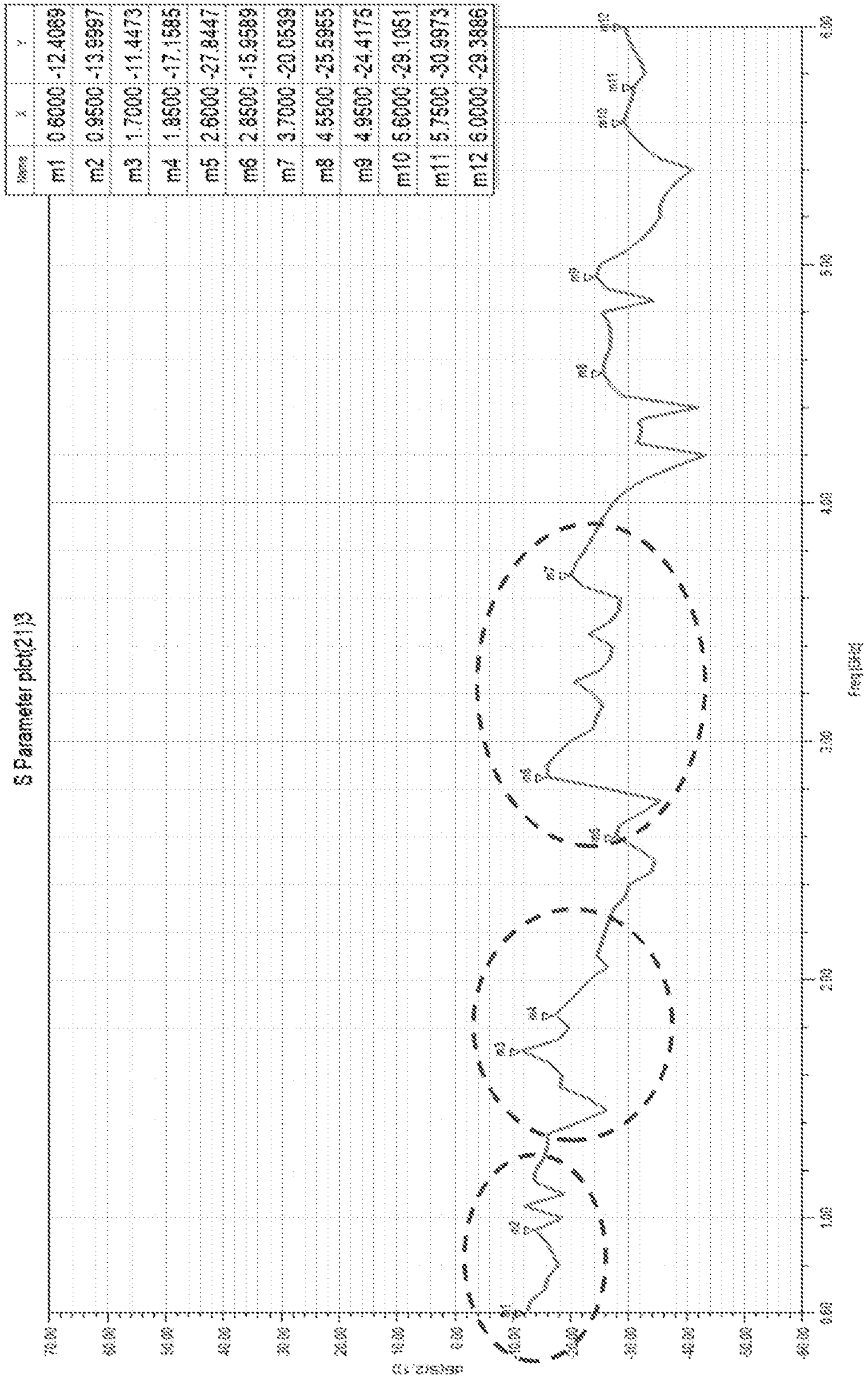

FIGS. 10A and 10B are a diagram comparing characteristics of the third reference antenna and a MIMO antenna according to an embodiment of the present disclosure.

FIG. 10A shows a S21 characteristic of a MIMO antenna according to an embodiment of the present disclosure, and FIG. 10B shows a S21 characteristic of the third reference antenna.

As shown in FIGS. 10A and 10B, it can be seen that in the region indicated in FIG. 10B, the isolation characteristic is lowered compared to the MIMO antenna according to an embodiment of the present disclosure.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. An omni-directional MIMO antenna, the antenna comprising:
- a board;
- a first feed line and a second feed line formed on the board and spaced apart from each other;
- a first radiator receiving a feed signal from the first feed line;
- a second radiator spaced apart from the first radiator by a predetermined distance and receiving a feed signal from the second feed line;
- a first ground pattern that surrounds the first feed line, is electrically connected to a ground, and extends in a longitudinal direction of the board;
- a second ground pattern that is spaced apart from the first ground pattern by a predetermined distance, surrounds the second feed line, is electrically connected to a ground, and extends in a longitudinal direction of the board;
- a parasitic patch formed on a rear surface of the board; and
- a first feed point formed on the rear surface of the board and providing a feed signal to the first feed line and a second feed point formed on the rear surface of the board and configured to provide a feed signal to the second feed line, wherein, from the parasitic patch, first and second projections protrude in a direction of the first feed point and the second feed point.

2. The omni-directional MIMO antenna according to claim 1, wherein the first and second projections protrude such that the first feed point and the second feed point are positioned between the first projection and the second projection.

3. The omni-directional MIMO antenna according to claim 1, wherein the parasitic patch is disposed such that a partial region of the parasitic patch is overlapped with the first ground pattern and the second ground pattern vertically.

4. The omni-directional MIMO antenna according to claim 2, wherein the omni-directional MIMO antenna further includes a connection element electrically connecting the first radiator and the second radiator and having a length of λ/2.

5. The omni-directional MIMO antenna according to claim 4, wherein on one side of the first ground pattern, a first stub is formed in a direction of the second ground pattern.

6. The omni-directional MIMO antenna according to claim 5, wherein on one side of the second ground pattern, a second stub is formed in a direction of the first ground pattern, and the first stub and the second stub are adjacent to each other to enable electromagnetic coupling.

7. The omni-directional MIMO antenna according to claim 6, wherein on the connection element, a third stub is formed to protrude in a space direction between the first ground pattern and the second ground pattern.

8. An omni-directional MIMO antenna, the antenna comprising:

a board;

a first feed line and a second feed line formed on the board and spaced apart from each other;

a first radiator receiving a feed signal from the first feed line;

a second radiator spaced apart from the first radiator by a predetermined distance and receiving a feed signal from the second feed line;

a first ground pattern that surrounds the first feed line, is electrically connected to a ground, and extends in a longitudinal direction of the board;

a second ground pattern that is spaced apart from the first ground pattern by a predetermined distance, surrounds the second feed line, is electrically connected to a ground, and extends in a longitudinal direction of the board; and a parasitic patch formed on a rear surface of the board, wherein, on one side of the first ground pattern, a first stub is formed in a direction of the second ground pattern, and on one side of the second ground pattern, a second stub is formed in a direction of the first ground pattern.

9. The omni-directional MIMO antenna according to claim 8, wherein the first stub and the second stub are adjacent to each other to enable electromagnetic coupling.

10. The omni-directional MIMO antenna according to claim 8, wherein on the rear surface of the board, a first feed point providing a feed signal to the first feed line and a second feed point for providing a feed signal to the second feed line are formed.

11. The omni-directional MIMO antenna according to claim 10, wherein, from the parasitic patch, first and second projections protrude in a direction of the first feed point and the second feed point.

12. The omni-directional MIMO antenna according to claim 11, wherein the first and second projections protrude such that the first feed point and the second feed point are positioned between the first projection and the second projection.

13. The omni-directional MIMO antenna according to claim 9, wherein the parasitic patch is disposed such that a partial region of the parasitic patch is overlapped with the first ground pattern and the second ground pattern vertically.

14. The omni-directional MIMO antenna according to claim 9, wherein the omni-directional MIMO antenna further includes a connection element electrically connecting the first radiator and the second radiator and having a length of λ/2.

15. The omni-directional MIMO antenna according to claim 14, wherein on the connection element, a third stub is formed to protrude in a space direction between the first ground pattern and the second ground pattern.

* * * * *